US010029651B2

(12) United States Patent
Laurent et al.

(10) Patent No.: US 10,029,651 B2
(45) Date of Patent: Jul. 24, 2018

(54) HEATING ELEMENT COMPRISING FILMS

(75) Inventors: Stephane Laurent, Clichy (FR); Bruno Mauvernay, Maisons Laffitte (FR); David Luxembourg, Chatillon Saint-Jean (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1158 days.

(21) Appl. No.: 13/980,228

(22) PCT Filed: Jan. 30, 2012

(86) PCT No.: PCT/FR2012/050184
§ 371 (c)(1),
(2), (4) Date: Jul. 17, 2013

(87) PCT Pub. No.: WO2012/104530
PCT Pub. Date: Aug. 9, 2012

(65) Prior Publication Data
US 2013/0299479 A1 Nov. 14, 2013

(30) Foreign Application Priority Data

Feb. 4, 2011 (FR) ..................... 11 50914

(51) Int. Cl.
*B60L 1/02* (2006.01)
*B32B 9/00* (2006.01)
(Continued)

(52) U.S. Cl.
CPC ........ *B60S 1/026* (2013.01); *B32B 17/10036* (2013.01); *B32B 17/10229* (2013.01);
(Continued)

(58) Field of Classification Search
CPC ........ B32B 17/10036; B32B 17/10229; B32B 17/10761; B60S 1/026; H05B 2203/013; H05B 3/36; H05B 3/86
(Continued)

(56) References Cited

U.S. PATENT DOCUMENTS 2,852,415 A  9/1958 Colbert et al.
3,885,855 A * 5/1975 Gross ..................... C03C 17/22
                                                      359/360
(Continued)

FOREIGN PATENT DOCUMENTS

DE   34 18 612    11/1984
GB   2 361 990    11/2001
(Continued)

OTHER PUBLICATIONS

International Search Report dated May 7, 2012 in PCT/FR12/050184 Filed Jan. 30, 2012.
(Continued)

*Primary Examiner* — Dana Ross
*Assistant Examiner* — Ket D Dang
(74) *Attorney, Agent, or Firm* — Oblon, McClelland, Maier & Neustadt, L.L.P.

(57) ABSTRACT

A heating element including: (I) a substrate equipped with a thin-film multilayer, the thin-film multilayer including a heating film that has an electrical sheet resistance lying between 20 and 200 ohms per square, and two nonmetallic dielectric films located on either side of the heating film; and (II) two conductive collectors designed to receive a voltage, where the heating film is unpatterned, made of metal, and electrically connected to the two conductive collectors.

19 Claims, 2 Drawing Sheets

(51) Int. Cl.
*B60S 1/02* (2006.01)
*H05B 3/86* (2006.01)
*H05B 3/36* (2006.01)
*B32B 17/10* (2006.01)

(52) U.S. Cl.
CPC ......... B32B 17/10761 (2013.01); H05B 3/36 (2013.01); H05B 3/86 (2013.01); *H05B 2203/013* (2013.01)

(58) Field of Classification Search
USPC ....... 428/469, 418, 458, 472, 697, 698, 699; 219/203, 541, 528, 543, 549
See application file for complete search history.

(56) References Cited

U.S. PATENT DOCUMENTS

| | | | | |
|---|---|---|---|---|
| 4,226,910 | A | * | 10/1980 | Dahlen ............ B32B 17/10174 359/360 |
| 4,450,201 | A | * | 5/1984 | Brill ................. B32B 33/00 428/336 |
| 4,771,167 | A | * | 9/1988 | Boulos ............. B32B 17/10036 156/99 |
| 4,952,783 | A | * | 8/1990 | Aufderheide ...... G02B 27/0006 219/528 |
| 4,976,503 | A | * | 12/1990 | Woodard ............... B32B 27/36 219/203 |
| 5,493,102 | A | * | 2/1996 | Takase ................. B32B 17/10 219/203 |
| 5,688,585 | A | * | 11/1997 | Lingle .................... C03C 17/36 359/359 |
| 5,750,267 | A | * | 5/1998 | Takase ................... B32B 17/10 219/522 |
| 6,559,419 | B1 | * | 5/2003 | Sol .................... B32B 17/10192 219/203 |
| 6,953,911 | B2 | * | 10/2005 | Bartrug .................... B32B 3/10 219/203 |
| 2003/0146199 | A1 | * | 8/2003 | Sol .................... B32B 17/10036 219/203 |
| 2006/0152137 | A1 | * | 7/2006 | Beteille ............ B32B 17/10036 313/503 |
| 2009/0135319 | A1 | * | 5/2009 | Veerasamy ........... G02F 1/1334 349/16 |
| 2009/0237782 | A1 | * | 9/2009 | Takamatsu .............. B32B 17/10 359/359 |
| 2010/0000669 | A1 | * | 1/2010 | Feng ..................... H01C 17/06 156/242 |
| 2010/0190001 | A1 | * | 7/2010 | Barton ................... B32B 17/10 428/337 |

FOREIGN PATENT DOCUMENTS

| | | |
|---|---|---|
| JP | 7 942 63 | 4/1995 |
| JP | 07-114979 | 5/1995 |
| JP | 07-196341 | 8/1995 |
| JP | 08-031555 | 2/1996 |
| JP | 09-086975 | 3/1997 |
| JP | 2002-134254 | 5/2002 |

OTHER PUBLICATIONS

U.S. Appl. No. 14/124,414, filed Dec. 6, 2013, Laurent, et al.
Decision of Final Rejection dated Jun. 28, 2016, in Japanese Patent Application No. 2013-552245 filed Jan. 30, 2012 (with English translation).

\* cited by examiner

HEATING ELEMENT COMPRISING FILMS

CROSS REFERENCE TO RELATED APPLICATIONS

The present application is a 35 U.S.C. § 371 national stage patent application of International patent application PCT/FR2012/050184, filed on Jan. 30, 2012, published as WO 2012/0104530 on Aug. 9, 2012, the text of which is incorporated by reference, and claims the benefit of the filing date of French application no. 1150914, filed on Feb. 4, 2011, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

Field of the Invention

The invention relates to a heating element comprising a substrate equipped with a thin-film multilayer, the thin-film multilayer comprising a heating film.

Description of the Related Art Including Information Disclosed Under 37 CFR 1.97 and 1.98

It is known to use such heating elements as heating windshields for automotive vehicles in order to demist and/or deice the windshield. When the glazing unit is mounted on a vehicle and electrically connected to a power supply, the heating film becomes hot.

The power P dissipated by a heating windshield is equal to the voltage U, supplied to the windshield, squared and divided by the electrical resistance R of the heating film ($P=U^2/R$). The dissipated power must be above 500 W/m$^2$ to effectively demist and/or deice a windshield. In vehicles powered by internal combustion engines, the on-board voltage is about 12 or 42 volts. The heating films used are made of silver. They have an electrical sheet resistance of about 1 or 4 ohm per square ($\Omega/\square$), respectively.

There is a need to equip electric vehicles with heating windows; however, the on-board voltage of an electric vehicle is much higher than that on board a vehicle powered by an internal combustion engine: it is about 100 volts or more, and may even be as much as several hundred volts. Thus, if a heating windshield designed for a vehicle powered by an internal combustion engine were to be installed in an electric vehicle, the power dissipated by the windshield would be very high. Now, conventional electrical systems, such as those present on board vehicles powered by internal combustion engines, would not be able to withstand the very high dissipated electrical power that could be generated by such a heating windshield if it were installed in an electric vehicle. However, to provide specific electrical systems would be very expensive and complicated.

In addition, it is also known to use heating elements comprising a silver heating film as electric radiators for buildings. These heating elements have the same high voltage problem mentioned above since the voltage available in buildings is mains voltage, namely 220 or 230 volts in Europe or 120 volts in the United States, i.e. much higher than 12 or 42 volts. To reduce the dissipated power (in order to stop the radiator from getting too hot), the electrical resistance of the heating film is increased by etching the heating film so as to increase the distance traveled by the electrons. This process is however complex and expensive.

There is therefore a need for a heating element comprising a substrate equipped with a thin-film multilayer, the thin-film multilayer comprising a heating film, which heating element can be easily installed in an electric vehicle or connected to the mains, and which is simple to manufacture.

BRIEF SUMMARY OF THE INVENTION

For this purpose, the invention provides a heating element comprising a substrate equipped with a thin-film multilayer, the thin-film multilayer comprising a heating film that has an electrical sheet resistance lying between 20 and 200$\Omega/\square$, and two nonmetallic dielectric films located on either side of the heating film, the heating element also comprising two conductive collectors designed to receive a voltage, the heating film not being machined and being electrically connected to the two conductive collectors.

According to another feature, the heating film is made of metal, said metal belonging to the group comprising niobium, molybdenum, nickel, chromium, tin, zinc, tantalum, hafnium, titanium, tungsten, aluminum, copper and alloys thereof.

According to another feature, the nonmetallic dielectric films are for example made of $Si_3N_4$, SnZnO, $SnO_2$ or ZnO.

According to another feature, the multilayer comprises at least one blocker layer located between the heating film and at least one of the nonmetallic dielectric films.

According to another feature, the heating film is between 2 and 30 nm in thickness.

According to another feature, the heating film is between 2 and 8 nm in thickness in order for the light transmission of the heating element to be at least 70% and preferably at least 75%.

According to another feature, the conductive collectors are placed near two opposed edges of the heating element.

According to another feature, the substrate equipped with a thin-film multilayer is made of organic or mineral glass.

According to another feature, the substrate equipped with a thin-film multilayer is transparent.

According to another feature, the heating element furthermore comprises an interlayer and a second substrate, the interlayer being placed between the two substrates so as to form a laminated glazing unit, the heating film being placed facing the interlayer.

According to another feature, the heating element furthermore comprises a third substrate separated from the laminated glazing unit by a gas-filled cavity.

According to another feature, the heating element furthermore comprises at least a second substrate, the substrates being separated pairwise by a gas-filled cavity so as to form an insulating multiple glazing unit, the heating film being placed facing the gas-filled cavity.

According to another feature, the second substrate is made of organic or mineral glass.

According to another feature, the second substrate is transparent.

The invention also relates to an architectural glazing unit comprising a heating element such as described above.

The invention also relates to a glazing unit for an electric automotive vehicle, the glazing unit comprising a heating element such as described above.

The invention also relates to an electric automotive vehicle comprising a glazing unit such as described above, especially a windshield, a front side window, a rear side window, a rear window or a sunroof.

The invention also relates to an electric radiator for buildings, the radiator comprising a heating element such as described above.

BRIEF DESCRIPTION OF THE SEVERAL VIEWS OF THE DRAWINGS

Other features and advantages of the invention will now be described with regard to the drawings, in which.

DETAILED DESCRIPTION OF THE INVENTION

The invention relates to a element comprising at least one substrate equipped with a thin-film multilayer, the thin-film multilayer comprising a heating film. The heating film has an electrical sheet resistance lying between 20 and 200Ω/□. The heating film allows a glazing unit to be demisted/deiced or a room to be heated. The multilayer also comprises two nonmetallic dielectric films located on either side of the heating film. These nonmetallic dielectric films have an antireflection function. The heating element also comprises two conductive collectors designed to receive a voltage, the heating film being electrically connected to the two conductive collectors in order to be heated. The heating film is full, i.e. unpatterned, i.e. it has not been etched. Thus, no regions have been removed from the film and no geometric features, allowing the effective resistance of the glazing unit to be increased, have been etched in the heating film.

Thus, the electrical sheet resistance of the heating film lies between 20 and 200Ω/□ without there being a need to etch it. This simplifies the process for manufacturing the heating element. In addition, the dissipated power is now controlled and compatible with conventional electrical systems. The invention therefore makes it easy to install a heating element according to the invention in an electric vehicle or to connect it to the mains.

Figure 1:
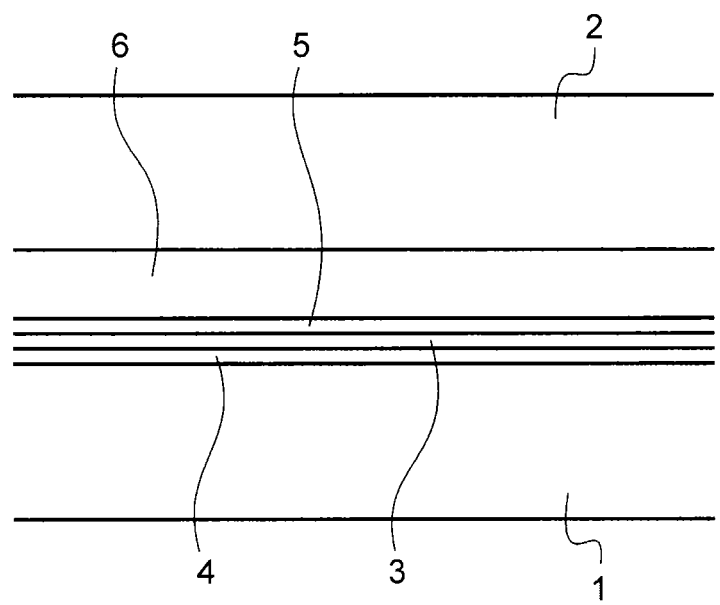
FIG. 1 shows a cross-sectional view of a heating element according to an embodiment of the invention, where 1 and 2 are substrates, 3 is a heating film, 4 and 5 are non-metallic dielectric films, and 6 is an interlayer.
Figure 2:
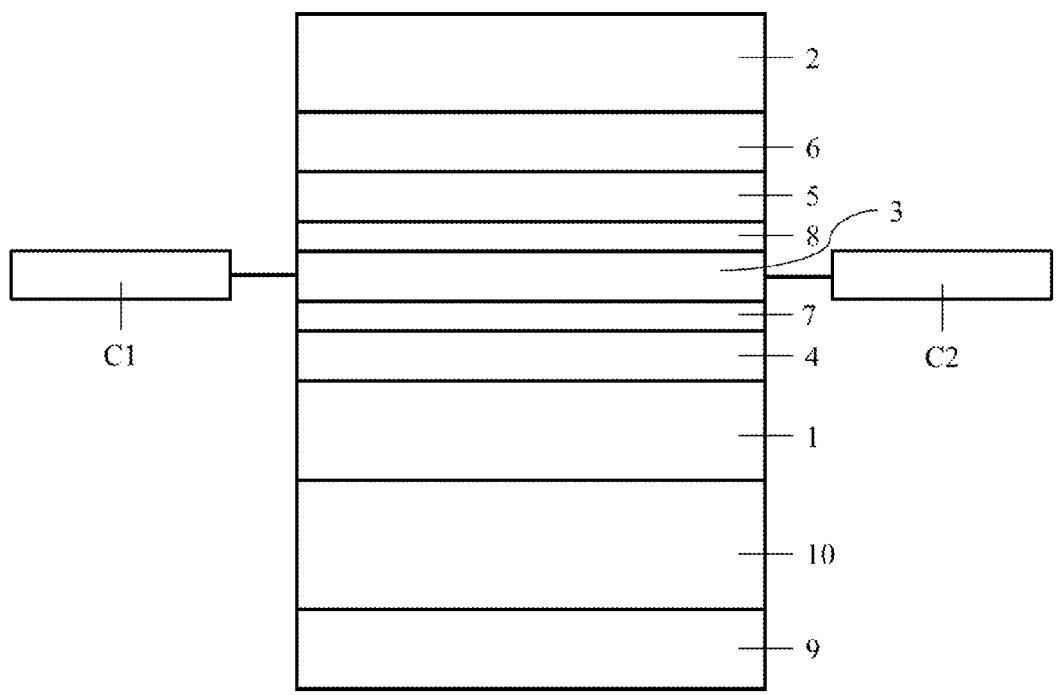
FIG. 2 shows a cross-sectional view of a heating element according to an embodiment of the invention, where 1, 2, and 9 are substrates, 3 is a heating film, 4 and 5 are non-metallic dielectric films, 6 is an interlayer, 7 and 8 are blocker layers (underblocker and overblocker, respectively), 10 is a gas-filled cavity, and C1 and C2 are conductive collectors.

FIG. 1 shows a cross-sectional view of a heating element according to an embodiment of the invention.

The heating element comprises a substrate 1 on which a thin-film multilayer has been deposited comprising a heating film 3. The thin films of the multilayer are for example deposited by sputtering, especially magnetron sputtering.

The substrate 1 is for example made of organic or mineral glass. It is for example transparent, in particular when it is used in an application requiring that it be seen through, for example in an automotive or architectural glazing unit. The substrate 1 is preferably, but nonlimitingly, a glass sheet.

The heating film 3 is made of metal, for example of niobium, molybdenum, nickel, chromium, tin, zinc, tantalum, hafnium, titanium, tungsten, aluminum or copper or one of the alloys thereof.

The thin-film multilayer also comprises two nonmetallic dielectric films 4, 5. The heating film 3 lies between the two nonmetallic dielectric films 4, 5. These nonmetallic dielectric films 4, 5 are for example made of $Si_3N_4$, SnZnO, $SnO_2$ or ZnO. These films 4, 5 have an antireflection function that improves visibility through the heating element equipped with the heating film 3, in particular when the substrate is made of glass. The nonmetallic dielectric films 4, 5 are for example deposited by sputtering, especially magnetron sputtering.

The thin-film multilayer optionally comprises at least one blocker layer (not shown) located between the heating film 3 and at least one of the nonmetallic dielectric films 4, 5. Thus the blocker layer may be placed as an underblocker for the heating film 3, therefore lying between the substrate and the heating film 3, and/or placed as an overblocker for the heating film 3. The one or more blocker layers are very thin. They protect, if required, the heating film 3 from damage liable to occur during deposition of the nonmetallic dielectric film 5 on the underblocker for the heating film 3. They also protect the heating film 3 during any high-temperature heat treatments, such as bending and/or tempering, for example in order to prevent oxidation of said film 3. The one or more blocker layers are for example made of NiCr, titanium or aluminum. The one or more blocker layers are for example deposited by sputtering, especially magnetron sputtering.

The thickness of the heating film 3 lies between 2 and 30 nm. This thickness range is both technically easy to produce and allows a film of a controlled thickness to be obtained over the entire area of the glass sheet. When the heating element is used in a glazing unit application where the light transmission must be at least 70% and even at least 75%, i.e. in particular for windshields and front side windows, the thickness of the heating film 3 lies between 2 and 8 nm.

To obtain a light transmission of at least 75%, niobium and molybdenum are entirely suitable materials for the heating film 3 in order for the film 3 of between 2 and 8 nm in thickness to have an electrical sheet resistance, for the heating film, of between 20 and 200 Ω/□.

The set of materials in the group comprising niobium, molybdenum, nickel, chromium, tin, zinc, tantalum, hafnium, titanium, tungsten, aluminum, copper and their alloys are suitable materials for the heating film 3 in order for the film 3 of between 2 and 30 nm in thickness to have an electrical sheet resistance, for the heating film, of between 20 and 200Ω/□ when the heating element is not used in an application that is constrained by light transmission.

The heating element also comprises two conductive collectors (not shown) placed near two opposed edges of the heating element. The heating film 3 is electrically connected to these conductive collectors. The conductive collectors are terminals for supplying voltage to the heating film 3. In the case of a heating windshield, the conductive collectors are for example placed at the top and bottom of the windshield.

In a first variant, the heating element preferably comprises a second substrate 2 and an interlayer 6, the interlayer being placed between the two substrates 1, 2 so as to form a laminated glazing unit. In this configuration, the heating film 3 and the nonmetallic dielectric films 4, 5 are preferably deposited on the side of the substrate 1 that faces the interlayer 6 and that is not oriented toward the exterior of the heating element, so as to protect the thin-film multilayer from external attack. The interlayer is for example made of standard PVB (polyvinyl butyral) or of any material suitable for acoustic damping. The material suitable for acoustic damping is then preferably placed between two standard PVB layers.

In this first variant, the second substrate 2 is for example made of organic or mineral glass. It is for example transparent, in particular when it is used in an application requiring that it be seen through, for example an automotive or architectural glazing unit. The substrate 2 is preferably, but nonlimitingly, a glass sheet.

A heating element according to this first variant may be employed as a glazing unit for an automotive vehicle, in particular an electric vehicle. When the glazing unit is a windshield or a front side window, it is subject to visibility constraints. Specifically, the light transmission must be at least 70%, even at least 75%, to meet standards in force. This light transmission is achieved with a heating glazing unit as defined above. In contrast, when the glazing unit is a rear side window, a rear window or a sunroof, it is not subject to any light transmission constraints.

A heating element according to this first variant may also be employed as an architectural glazing unit, for example in a partition between two rooms, or as external curtain walling for a building in combination with a third substrate separated from the heating element by a gas-filled cavity. The third substrate is for example made of organic or mineral glass. The third substrate is for example transparent.

A heating element according to this first variant may also be employed as an electric radiator for a building.

In a second variant, the heating element comprises at least a second substrate 2. The substrates 1, 2 are separated pairwise by a gas-filled cavity so as to form an insulating multiple glazing unit. The heating film 3 is preferably placed facing the gas-filled cavity and is not oriented toward the exterior of the heating element, so as to protect the thin-film multilayer from external attack.

A heating element according to this second variant may be employed as an architectural glazing unit.

The invention therefore also relates to a glazing unit for an electric automotive vehicle, in particular a windshield or a front side window, which must have a light transmission of at least 70% or even at least 75%, or even a rear side window, a rear window or even a sunroof, which are not subject to any light transmission constraints. The invention also relates to an electric automotive vehicle comprising such a glazing unit. The invention also relates to an architectural glazing unit or an electric radiator for buildings.

In the case of a glazing unit for a vehicle or building or an electric radiator for a building, the conductive collectors are connected in a known way to a power supply and receive a voltage via this power supply. When a voltage is applied to the heating film it heats up. By virtue of the invention, conventional power supplies may be used.

In the case of an automotive or architectural glazing unit, the aim of the heating film is to demist and/or deice the glazing unit.

In the case of a radiator, the aim of the heating film is essentially domestic heating but it may also be used for demisting purposes, in particular when it is used in a bathroom.

A heating element according to the invention comprising the following multilayer:

Glass/$Si_3N_4$/Nb/$Si_3N_4$/PVB/Glass with, in order, the following thicknesses:

| | Material | | | | | |
|---|---|---|---|---|---|---|
| | Glass | $Si_3N_4$ | Nb | $Si_3N_4$ | PVB | Glass |
| Thickness | 2 mm | 45 nm | 3 nm | 65 nm | 0.76 mm | 2 mm | has an electrical sheet resistance of 150Ω/□. In this example, the niobium film is the heating film and there is no blocker layer. A 75 cm-tall heating element, supplied with a voltage of 220 V then dissipates a power per unit area of 575 W/m$^2$ and has a light transmission of 70%. Such a heating element may be employed as a windshield or a front side window of an electric vehicle.

Likewise, a heating element according to the invention comprising the following multilayer:

Glass/$Si_3N_4$/Al/Cu/Al/$Si_3N_4$/PVB/Glass with, in order, the following thicknesses:

| | Material | | | | | | |
|---|---|---|---|---|---|---|---|
| | Glass | $Si_3N_4$ | Al | Cu | Al | $Si_3N_4$ | PVB | Glass |
| Thickness | 2 mm | 33 nm | 1.3 nm | 5.6 nm | 1.3 nm | 33 nm | 0.76 mm | 2 mm | has an electrical sheet resistance of 40Ω/□. In this example, the copper film is the heating film and the aluminum films are the blocker layers. A 75 cm-tall heating element supplied with a voltage of 220 V then dissipates a power per unit area of 2150 W/m$^2$ and has a light transmission of 70%. Such a heating element may be employed as a windshield or front side window of an electric vehicle.

Likewise, a heating element according to the invention comprising the following multilayer:

Glass/$Si_3N_4$/Ti/Nb/Ti/$Si_3N_4$/PVB/Glass with, in order, the following thicknesses:

| | Material | | | | | | |
|---|---|---|---|---|---|---|---|
| | Glass | $Si_3N_4$ | Ti | Nb | Ti | $Si_3N_4$ | PVB | Glass |
| Thickness | 2 mm | 42 nm | 0.5 nm | 15 nm | 0.5 nm | 54 nm | 0.76 mm | 2 mm | has an electrical sheet resistance of 23Ω/□. In this example, the niobium film is the heating film and the titanium films are the blocker layers. A 1 m-tall heating element supplied with a voltage of 220 V then dissipates a power per unit area of 2100 W/m$^2$ and has a light transmission of 27%. Such a heating element may be employed as a rear side window, a sunroof or a rear window of an electric vehicle, or even as an architectural glazing unit, or as an electric radiator for buildings.

Likewise, a heating element according to the invention comprising the following multilayer:

Glass/Si$_3$N$_4$/NiCr/Al/NiCr/Si$_3$N$_4$/PVB/Glass with, in order, the following thicknesses:

| | Material | | | | | | |
|---|---|---|---|---|---|---|---|
| | Glass | Si$_3$N$_4$ | NiCr | Al | NiCr | Si$_3$N$_4$ | PVB | Glass |
| Thickness | 2 mm | 50 nm | 1 nm | 5.5 nm | 1 nm | 50 nm | 0.76 mm | 2 mm | has an electrical sheet resistance of 80Ω/□. In this example, the aluminum film is the heating film and the NiCr films are the blocker layers. A 1 m-tall heating element supplied with a voltage of 220 V then dissipates a power per unit area of 605 W/m$^2$ and has a light transmission of 50%. Such a heating element may be employed as a rear side window, a sunroof or a rear window of an electric vehicle, or even as an architectural glazing unit, or as an electric radiator for buildings.

The invention claimed is:

1. A heating element, comprising:
   a substrate provided with a thin-film multilayer, the thin-film multilayer comprising no more than one heating film, and two nonmetallic dielectric films located on either side of the heating film; and
   two conductive collectors designed to receive a voltage, wherein the heating film is full, made of metal and electrically connected to the two conductive collectors,
   wherein the heating film has an electrical sheet resistance in the range from 20 to 200 ohms per square,
   wherein the heating film has a thickness in the range from 2 to 30 nm, and
   wherein the metal of the heating film is at least one selected from the group consisting of niobium, molybdenum, nickel, chromium, tin, zinc, tantalum, hafnium, titanium, tungsten, aluminum, copper, and any alloy thereof.

2. The heating element of claim 1, wherein the metal of the heating film is at least one selected from the group consisting of niobium, molybdenum, chromium, tin, zinc, tantalum, hafnium, titanium, tungsten, aluminum, copper, and any alloy thereof.

3. The heating element of claim 1, wherein the nonmetallic dielectric films comprise Si$_3$N$_4$, SnZnO, SnO$_2$, or ZnO.

4. The heating element of claim 1, wherein the thin-film multilayer further comprises at least one blocker layer located between the heating film and at least one of the nonmetallic dielectric films.

5. The heating element of claim 1, wherein the thickness of the heating film is in the range from 2 to 8 nm such that the heating element has a light transmission of at least 70%.

6. The heating element of claim 1, wherein the conductive collectors are placed near two opposed edges of the heating element.

7. The heating element of claim 1, wherein the substrate is made of organic or mineral glass.

8. The heating element of claim 1, wherein the substrate is transparent.

9. The heating element of claim 1, further comprising:
   an interlayer; and
   a second substrate,
   wherein the interlayer is placed between the two substrates to form a laminated glazing unit, and the heating film is placed facing the interlayer.

10. The heating element of claim 9, further comprising:
    a third substrate, which is separated from the laminated glazing unit by a gas-filled cavity.

11. The heating element of claim 9, wherein the second substrate is made of organic or mineral glass.

12. The heating element of claim 9, wherein the second substrate is transparent.

13. The heating element of claim 1, further comprising:
    at least a second substrate, wherein the first substrate and the at least second substrate are separated pairwise by a gas-filled cavity to form an insulating multiple glazing unit,
    wherein the heating film is placed facing the gas-filled cavity.

14. The heating element of claim 1, wherein the thickness of the heating film is in the range from 2 to 8 nm such that the heating element has a light transmission of at least 75%.

15. The heating element of claim 1, wherein the metal of the heating film is at least one selected from the group consisting of niobium, molybdenum, tin, zinc, hafnium, and any alloy thereof.

16. An architectural glazing unit, comprising the heating element of claim 1.

17. An electric automotive vehicle glazing unit, comprising the heating element of claim 1.

18. The electric automotive vehicle glazing unit of claim 17, in the form of a windshield, a front side window, a rear side window, a rear window, or a sunroof.

19. An electric radiator, comprising the heating element of claim 1.

* * * * *